US008769032B2

(12) United States Patent
Ginevan et al.

(10) Patent No.: US 8,769,032 B2
(45) Date of Patent: Jul. 1, 2014

(54) METHOD AND SYSTEM FOR SUGGESTING AN OPTIMAL COMMUNICATION MODE

(75) Inventors: Sean M. Ginevan, Mountain View, CA (US); Jesse W. Lindeman, San Jose, CA (US); Jameson F. Blandford, Mountain View, CA (US); Alan S. Cohen, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 491 days.

(21) Appl. No.: 12/534,448

(22) Filed: Aug. 3, 2009

(65) Prior Publication Data

US 2011/0029647 A1 Feb. 3, 2011

(51) Int. Cl.
*G06F 15/16* (2006.01)
*H04L 12/14* (2006.01)
*H04L 29/12* (2006.01)

(52) U.S. Cl.
CPC .......... *H04L 12/145* (2013.01); *H04L 61/2596* (2013.01); *H04L 61/35* (2013.01)
USPC ............ 709/207; 709/223; 709/204; 715/733

(58) Field of Classification Search
CPC .... H04L 12/145; H04L 61/2596; H04L 61/35
USPC ....................................................... 709/207
See application file for complete search history.

(56) References Cited

U.S. PATENT DOCUMENTS

| 6,807,423 | B1* | 10/2004 | Armstrong et al. ........... 455/440 |
| 6,853,634 | B1 | 2/2005 | Davies et al. |
| 7,363,344 | B1 | 4/2008 | Coletrane et al. |
| 7,454,464 | B2 | 11/2008 | Puthenkulam et al. |
| 2003/0023690 | A1* | 1/2003 | Lohtia ........................... 709/206 |
| 2006/0123346 | A1 | 6/2006 | Totman et al. |
| 2006/0277544 | A1* | 12/2006 | Bjoernsen et al. ............ 718/100 |
| 2007/0244980 | A1 | 10/2007 | Baker, III et al. |
| 2007/0250622 | A1 | 10/2007 | Granito |
| 2008/0140788 | A1* | 6/2008 | Carter et al. .................. 709/206 |
| 2008/0256192 | A1* | 10/2008 | Pinard et al. .................. 709/206 |
| 2009/0022095 | A1* | 1/2009 | Spaur et al. ................... 370/329 |
| 2010/0030889 | A1* | 2/2010 | Fuchs et al. ................... 709/224 |

* cited by examiner

*Primary Examiner* — Jude Jean Gilles
*Assistant Examiner* — Jaren M Means
(74) *Attorney, Agent, or Firm* — Brinks Gilson & Lione (57) ABSTRACT

A method for communicating information includes ranking, by a central processing server, one or more available communication modes according to a context of a recipient of a communication and one or more rules. The ranked available communication modes may be communicated to a sender of the communication. The context of the recipient corresponds to the availability of the recipient and/or the location of the recipient. The available communication modes correspond to capabilities associated with devices that are in proximity with the recipient. Whether devices are in proximity with the recipient is accomplished by locating the devices via a device location server. The communication modes may be ranked according to a cost and/or appropriateness of the available communication modes.

21 Claims, 6 Drawing Sheets

METHOD AND SYSTEM FOR SUGGESTING AN OPTIMAL COMMUNICATION MODE

FIELD

The present application relates generally to a process for communicating information between individuals. More specifically, the present application relates to a method and system for suggesting an optimal communication mode.

BACKGROUND

As communication technology has advanced, so to have the number of ways in which individuals communicate with one another. For example, many individuals possess computers, cell phones, and landline phones. These technologies enable sending email, text messages, voice messages, and video messages.

However, with each new technology comes a new level of intrusiveness. For example, when trying to get a hold of an individual, people usually just call a cell phone because the odds are that the individual is carrying their cell phone. However, the individual may be busy or in a meeting. In either case, the individual probably does not want to be disturbed unless the message is important.

Another problem with new technology is that there is often times a cost associated with providing the new mode of communication. For example, cell phones are convenient, but the cost associated with making cell phone calls can be high compared to sending an email or using a landline phone.

BRIEF DESCRIPTION OF THE DRAWINGS

The accompanying drawings are included to provide a further understanding of the claims. The drawings are incorporated in and constitute a part of this specification and illustrate exemplary embodiments that fall within the scope of the claims.

DETAILED DESCRIPTION

To overcome the problems identified above a method and system for suggesting an optimal communication mode is provided. Generally, a sender of a communication requests from the system an optimal communication mode for communicating with a recipient of the communication. The system determines the context of the recipient and the communication modes available for communicating with the recipient. Then, the system ranks the available communication modes according to a set of rules. The ranked communication modes are then communicated to the sender so that the sender can choose the most appropriate communication mode.

Figure 1:
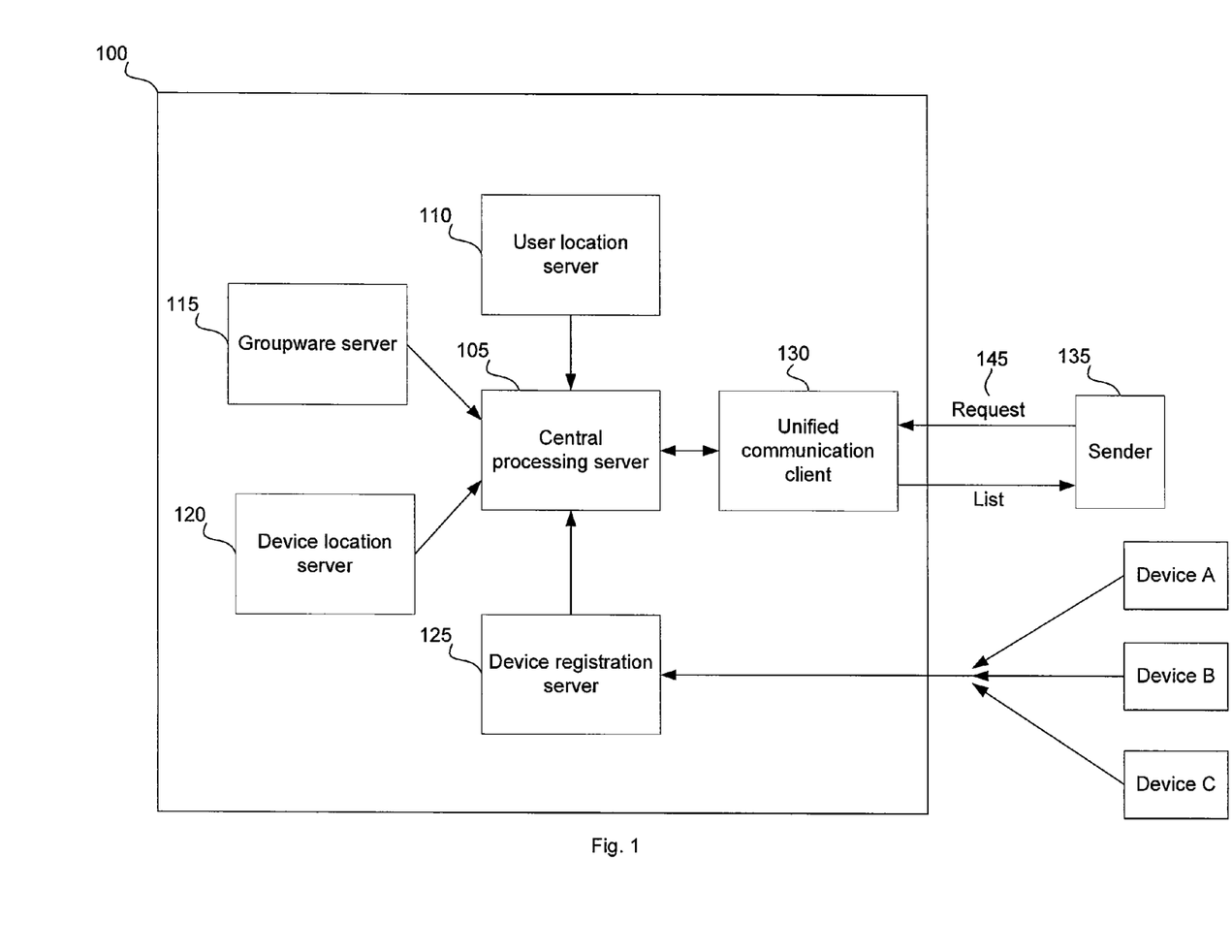
FIG. 1 illustrates one embodiment of a system for suggesting an optimal communication mode.

FIG. 1 illustrates an exemplary system 100 for suggesting an optimal communication mode for communicating information between a sender 135 and a recipient. The system 100 includes a central processing server 105, in communication with a groupware server 115, a user location server 110, a device location server 120, a device registration server 125, and a unified communication client 130. The various servers may correspond to any generalized computing device, such as an Intel™, AMD™, and/or PowerPC™ based computer running an operating system, such as a Microsoft Windows™, Linux™, and/or Unix™ operating system. The servers may be adapted to communicate with other computers via an interface, such as a network interface. Although shown as separate entities, the functionality associated with each server, described in more detail below, may reside in fewer servers or be combined into a single server. Alternatively, the functionality of a given server may be distributed across additional servers.

The groupware server 115 is operable to enable collaboration among users registered with the groupware server 115. For example, the groupware server 115 may correspond to a Microsoft Exchange™, or similar server. Tools provided by the groupware server 115 may facilitate email communications, instant messaging, document sharing, and/or other functions. Calendaring tools may also be provided. The calendaring tools may enable users of the groupware server 115 to set appointments and reminders. In setting an appointment, a user may specify, for example, a time and a place of a meeting to be attended at some future date. The user may also specify whether he is busy or available at a given time and date.

Information provided by the groupware server 115 may be communicated to the central processing server 105 and may enable the central processing server 105 to determine a context of a recipient of a communication who is also a user associated with the groupware server 115. The context may include activities associated with the recipient at a given time and date. For example, the context of the recipient may be that he is in an all day meeting and/or that he is in a meeting with a particular person. As described below, the context of the recipient may be utilized to determine the most appropriate mode for communicating with the recipient. The context may be associated with a meeting, location, availability, communications options (e.g., low charge of a device limiting availability or frequency of use indicating preference of communication), or other user associated context. Location will be used herein as an example.

The user location server 110 is operable to determine the location or other context of a user and communicate the location or context to the central processing server 105. In some embodiments, the user location server 110 receives information from various receiving devices. For example, in an enterprise environment, the user location server 110 may receive information from various RF ID and/or Wi-Fi employee badge monitors located throughout an enterprise environment. The monitors may be utilized to sense a presence of an individual wearing a badge. Information stored in the badge may enable identifying the individual. In some embodiments, the precise location of the individual may be determined by triangulating signals received from various monitors that detect the individual's badge.

Information provided by the user location server 110 may be communicated to the central processing server 105 and may enable the central processing server 105 to further define the context of a recipient of a communication. For example, calendaring information may indicate that a recipient of a communication is in an all day meeting. This may suggest that a less intrusive communication mode of communication is preferred. On the other hand, information provided by the user location server 110 may indicate that the recipient is actually in a cafeteria. In this case, a different communication mode may be more appropriate. Other people at the same location may further indicate context, such as other team members or a supervisor at the same location indicating a meeting even though in the cafeteria.

The device registration server 125 is operable to receive and store registration information associated with the various devices that may be utilized within the system 100. For example, cellular telephones, pagers, laptops, and other devices associated with employees in an enterprise environment may be registered with the device registration server 125.

The registration information may include tracking information that enables tracking a device. The tracking information may include information that enables the device location server 120, described below, to track a given device. For example, the international mobile subscriber identity (IMSI) of a cell phone, a Bluetooth® media access control (MAC) address of a laptop, and/or a Wi-Fi ID associated with a device may be stored to a database (not shown) in communication with the device registration server 125 and utilized to track the device. Other tracking information may also be stored.

The registration information may also include device capability information that defines the capabilities associated with a given device. For example, the information may specify a data rate associated with a device. The information may also specify whether the device has video conferencing, text messaging, email, and/or any other capabilities.

The device location server 120 is operable to determine a location of a registered device and communicate device location information to the central processing server 105. The device location server 120 may be adapted to receive information from various sources. For example, cellular network carriers may provide information that enables determining the location of a cell phone in their network. This information may be generated by way of global positioning system (GPS) circuitry within the cell phone, via triangulation of the device, or by other means.

The device location server 120 may also be adapted to receive information from various devices within an enterprise environment operable to communicate with registered devices.

For example, Wi-Fi enabled equipment, such as network routers and access points, throughout an enterprise environment, such as a corporate environment, may communicate information that defines the signal strength generated from a Wi-Fi enabled device such as a laptop computer or a Wi-Fi enabled PDA. In some embodiments, the location of a Wi-Fi enabled device may be determined via triangulation. For example, the location of the Wi-Fi enabled device may be determined by analyzing the received signal strength associated with the Wi-Fi enabled device at the Wi-Fi enabled equipment. Other technologies may be utilized to track devices. For example, GPS circuitry in a given device may be communicated directly to the device location server 120.

The device location information enables the central processing server 105 to determine available communication modes for communicating with a recipient of a communication. For example, the context of a recipient may indicate that the recipient is in his office during a period of time. On the other hand, a cell phone registered with the recipient may be located in a parking lot outside the office. In this case, the cell phone may not be an available communication mode for communicating with the recipient during that time period. Any criteria may be used for resolving location conflicts, such as comparison of number of devices reporting a given location or comparison with a schedule. In some embodiments, the context of a recipient may also include information that defines the availability of any devices with which the recipient is associated.

The unified communication client 130 may correspond to logic and/or code operable to receive a request 145 from a sender 135 requesting a best communication mode. The unified communication client 130 may also be operable to communicate one or more available communication modes to the sender 135 in response to a request or without a request. The available communication modes may be ranked, as described below. The unified communication client 130 may reside within the central processing server 105 and/or a device through which the sender 135 communicates the request 145.

In some embodiments, the unified communication client 130 is operable to generate a user interface though which the sender 135 specifies a recipient of a communication and/or other parameters. Alternatively or in addition, the unified communication client 130 may communicate with software operating on a sender's 135 device.

Figure 2:
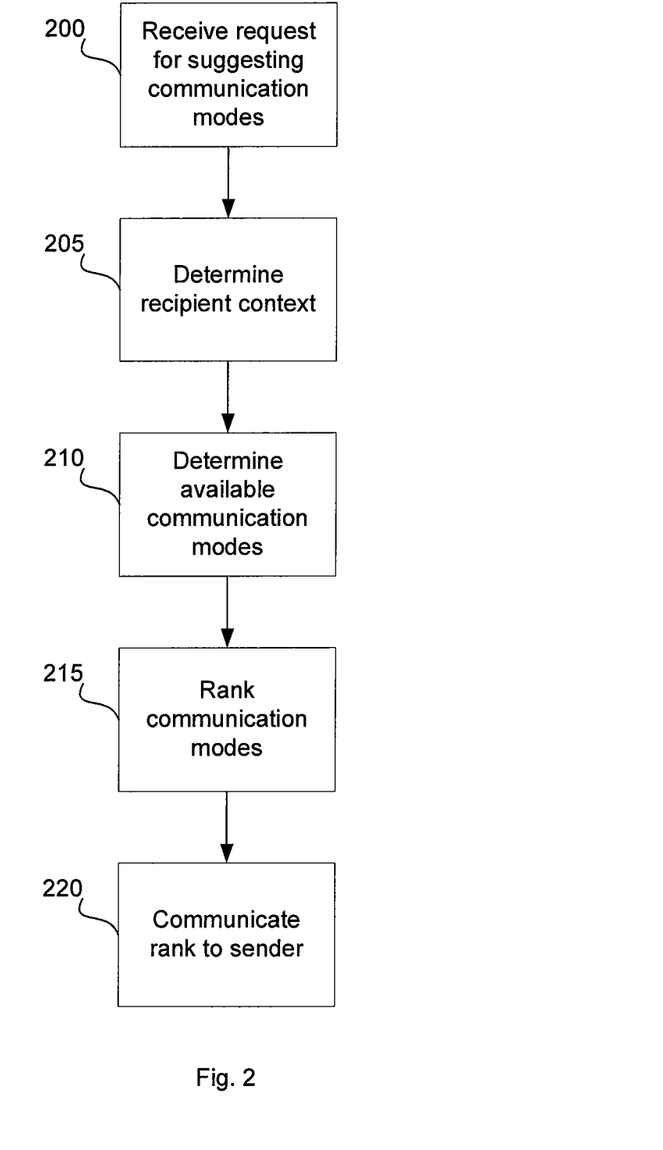
FIG. 2 is a block diagram of exemplary operations carried out by a central processing server of the system.

The central processing server 105 may be configured to determine the best communication mode for communicating with a recipient based on information communicated from the groupware server 115, the user location server 110, the device location server 120, and/or the device registration server 125. In some implementations, the central processing server 105 may be in communication with a machine-readable storage medium (not shown) such as a random-access-memory (RAM), read-only-memory (ROM), FLASH memory, a different memory, or any combination of these memories. A computer program that includes one or more code sections may be stored on the machine-readable storage medium. The computer program may include instructions operable to cause the central processing server or other machine to determine the best communication mode for communicating with the recipient based on the information communicated from the sender 134, the groupware server 115, the user location server 110, the device location server 120, and/or the device registration server 125. The various operations performed by the central processing server 105 are shown in FIG. 2 and described below. The computer-readable-medium may have instructions stored thereon that cause the central processing server to perform these operations.

FIG. 2 is a block diagram of operations that may be carried out by the central processing server 105 or other device of FIG. 1, or another device not shown on FIG. 1. At block 200, a request for suggesting a best communication mode may be received. For example, a sender 135 may communicate a request 145 to the central processing server 105 via the unified communication client 130. The request 145 may include information that identifies the intended recipient of a communication.

At block 205, context of a recipient may be determined. For example, as described above, groupware information and/or recipient location information may be communicated by the groupware server 115 and/or the user location server 110, respectively, to the central processing server 105. This information may be utilized to determine the context of the recipient of the communication. For example, the groupware information may indicate that the recipient is in a meeting, and the location information may indicate that the recipient is located in his supervisor's office. The context of the recipient in this case is that the recipient is in a meeting with his supervisor.

Figure 3A:
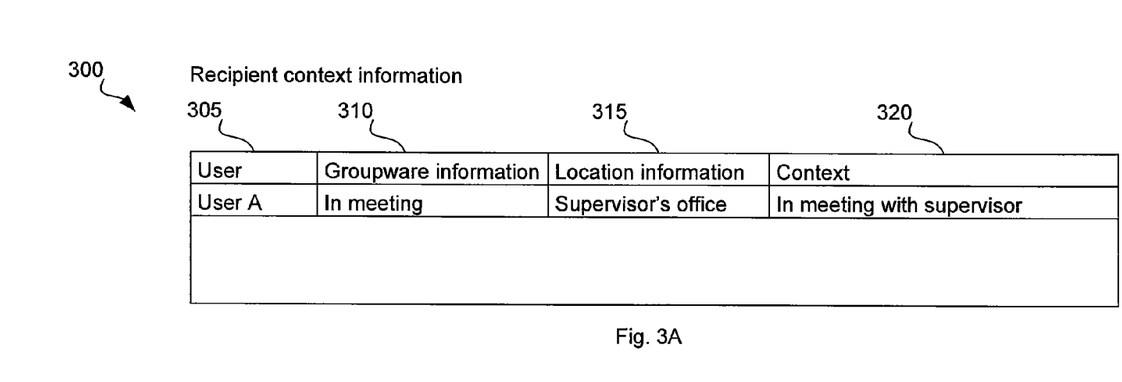
FIG. 3A is an exemplary table that may be maintained by the central processing server for tracking the context of users registered with the system.

FIG. 3A is an exemplary table 300 that may be maintained by the central processing server 105 for tracking the context of users registered with the system 100 of FIG. 1. As shown, the exemplary table 300 includes a user column 305, a groupware information column 310, a location column 315, and a context column 320. Other (different, additional or less) information may be stored in the table 300.

The user column 305 may include user identifying information associated with the registered users of the system 100 of FIG. 1. For example, every user registered with the system 100 via the device registration server 125 may be listed in the user column 335.

The groupware information column 310 includes groupware information associated with each of the registered users. For example, calendaring information provided by a groupware server 115 may indicate that a given user is in a meeting.

The location information column 315 includes location information that defines the location of each of the registered users. The location of each user may be determined as described above. For example, various monitors throughout an enterprise environment may track a badge worn by the user.

The context column 320 includes information that defines the context of each registered user. For example, as shown in the exemplary table 300, if the groupware information and location information indicate that User A is in a meeting and that User A is in his supervisor's office, then the context information associated with User A may indicate that User A is in a meeting with his supervisor.

Returning to FIG. 2, at block 210, the communication modes that are available for communicating with a recipient may be determined. For example, the location of devices registered to the recipient may be located via the device location server 120 of FIG. 1. When the location of the device and the location of the recipient are in close proximity to one another, the device may be considered available. In instances where the device and recipient are not in close proximity, the device may be considered unavailable. For example, if the recipient is in his office, but his cell phone is his car, which is in the parking lot, his cell phone may be unavailable. On the other hand, his laptop computer may be in the office with him and, therefore, available.

At block 215, the central processing server 105 of FIG. 1 may rank the various available communication modes according to rules, which are described below. The ranked communication modes may then be communicated back to the sender at block 220. Alternatively, the highest ranked mode, with or without the corresponding ranking, is communicated without communication of other modes.

Figure 3B:
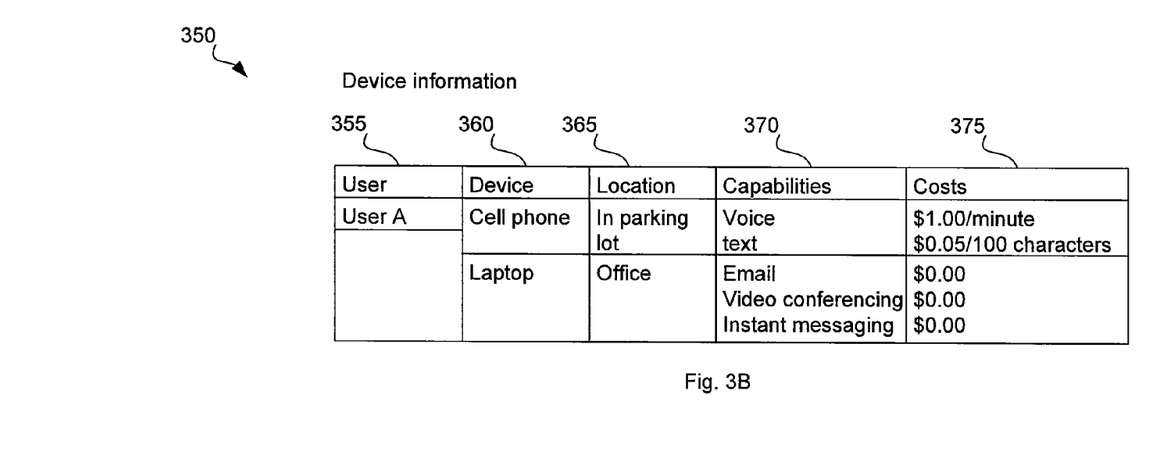
FIG. 3B is an exemplary table that may be maintained by the central processing server and utilized to track the location of devices associated with registered users of the system.

FIG. 3B is an exemplary table 350 that may be maintained by the central processing server 105 of FIG. 1 and utilized to track the location of devices associated with registered users of the system 100 of FIG. 1 to determine available communication modes. The exemplary table 350 may also be utilized when ranking available communication modes. The exemplary table 350 includes a user column 355 that includes user identifying information associated with registered users. The exemplary table 350 also includes a device column 360, a device location column 365, a device capabilities column 370, and a communications cost column 375.

The device column 360 includes device identifying information that defines one or more devices associated with a user. The devices may have been previously registered and associated with the user during registration of the device, as described above. For example, User A may have been associated with a cell phone and a laptop computer during device registration.

The location column 365 may include information that defines the location of a given device at any given time. For example, a cell phone associated with User A may be located in a parking lot outside of his office building. A laptop computer associated with User A may be located in his office. The location of the cell phone and laptop may have been determined by the device location server 120 of FIG. 1.

The capabilities column 370 includes information that defines various capabilities associated with a given device. For example, a cell phone associated with a given user may include voice, texting capabilities, and/or other capabilities. A laptop computer associated with the user may include e-mail, video conferencing, instant messaging and/or other capabilities.

The cost column 375 includes information that defines a cost associated with communications that occur via a given device. For example, the cost associated with making a voice call via a cell phone may be $1.00 per minute. The cost associated with sending a text message may be 5¢ per hundred characters. The cost associated with a landline phone may be 20¢ per minute. A cell phone may have higher associated costs because it has to go through a network provider. On the other hand, costs associated with e-mail, video conferencing, and/or instant messaging that occurs via a laptop computer may be free because these technologies utilize network resources that exist within an enterprise environment.

The information in the exemplary table 350 may be utilized by the central processor server 105 of FIG. 1 to rank the available modes for communicating information between a sender and a recipient. For example, information in the location column 365 may be utilized to determine whether a potentially available device is accessible to a recipient at a give time.

Information in the device capabilities column 370 may be utilized to determine the most effective communication mode for a given circumstance. For example, if the user is in a conference call or in a meeting, then a cell phone call may not be the most appropriate means for communicating with the recipient because that would interrupt the recipient. In this case, a text message or email may be more appropriate.

In another instance, the recipient may be in his office, but may be meeting with somebody in his office. In this case, an e-mail may be the most appropriate form of communication. On the other hand, the recipient may be in his office, but not necessarily busy at the moment. In this case, a video conference may be the most appropriate form of communication because it may be a more effective means for conveying information then, for example, a text message or email.

Figure 4:
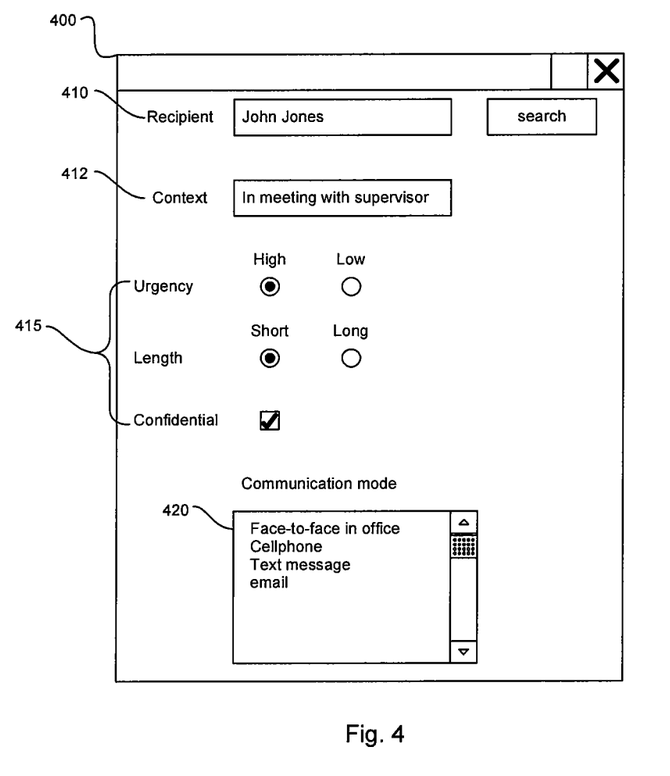
FIG. 4 illustrates an exemplary user interface that may be presented to a sender of a communication.

FIG. 4 illustrates an exemplary user interface screen 400 that may be presented to a sender of a communication that enables the sender to determine the best mode for communicating with a recipient of the communication. In some embodiments, the user interface is generated by the unified communication client 130 of FIG. 1 and communicated to the sender. For example, information that defines the user interface screen 400 may be communicated to a sender's web browser via a web server. Alternatively, a device, such as a cell phone or PDA, may include software operable to generate the exemplary user interface 400. The device may also be operable to communicate with the unified communication client 130 of FIG. 1. In other embodiments, a voice menu structure representing the interface is communicated using sound.

As shown, the exemplary user interface 400 includes a recipient field 410, a recipient context field 412, exemplary characterization fields 415, and a communication mode listing box 420. The recipient field 410 may be utilized by the sender to specify the recipient of a communication. For example, the user may simply enter the name of the recipient in the recipient field 410. The communication mode listing box 420 may be utilized to display a ranked list of available communication modes.

A recipient context field 412 may be provided to convey the context of the recipient to the sender. In some embodiments, the recipient context field 412 is not provided. In other embodiments, the decision to shown the recipient context field 412 may be based on the relationship between the recipient and the sender. For example, if the sender is the recipient's supervisor, the recipient context field 412 may be provided. On the other hand, if the roles are reversed, the recipient context field 412 may not be provided.

The exemplary characterization fields 415 may enable characterizing the communication sought with the recipient. For example, fields for specifying the urgency and length of the communication may be provided. Fields for specifying the confidentiality of the message may also be provided. Other fields for characterizing the communication may also be provided. In some embodiments, the way in which a communication is characterized is a factor in ranking the available communication modes. Alternatively, characterization is not provided or used.

Figure 5:
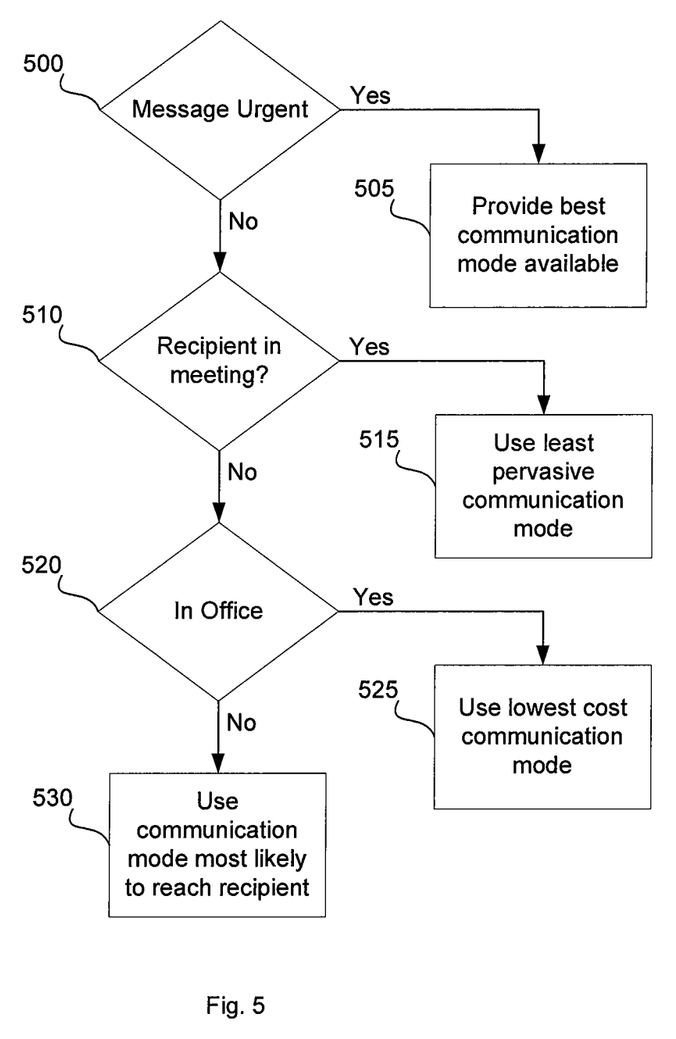
FIG. 5 is a flow chart illustrating an exemplary set of rules for ranking a list of available communication modes.

FIG. 5 is a flow chart illustrating an exemplary set of rules for ranking or sorting a list of available communication modes to be presented to a sender of a communication. It is to be understood that the number of rules and the way in which they are arranged are only exemplary and may be adapted to suit a particular need.

At block 500, if a communication is marked as urgent, then at block 505 the most invasive available communication mode may be given the highest ranking. In other words, the most invasive available communication mode may be the best communication mode for communicating between the sender and the recipient. In this case, if the available communication modes correspond to those shown in FIG. 4, then the face-to-face communication mode may be listed at the top, followed by cell phone, text message, and email, each of which may be less effective than the next in terms of getting the recipients attention. The relationship of the sender to the recipient may be considered to determine the level of invasiveness of the communication. For example, a supervisor as the sender may be given a higher invasiveness option than a team member where both indicate urgent.

If at block 500, the message is not urgent, then at block 510, if the context of the recipient indicates that the recipient is at a meeting then at block 515 the least invasive communication mode may be given the highest ranking. The recipient may indicate the invasiveness of any given type of communication. Alternatively, the invasiveness is programmed by another or provided automatically.

If at block 510, the recipient is not in a meeting, then at block 520, if the recipient is in his office, then at block 525, the lowest cost communication mode may be given the highest ranking. In this case, the lowest cost communication mode may be a face-to-face meeting provided the sender and the recipient are in close proximity to one another. If this is not the case, then the next lowest cost communication mode may be email.

If at block 520, the recipient is not in is office, then at block 530 the communication mode most likely capable of reaching the recipient may be given the highest ranking. For example, if the recipient is in possession of a registered cell phone, then the cell phone may be listed at the top. Other ranking schemes may be used, set by the recipient, or programmed.

Figure 6A:
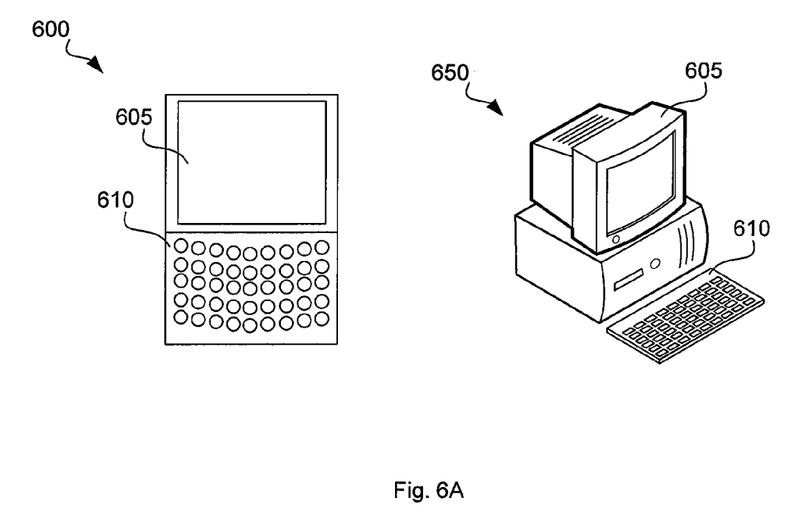
FIG. 6A shows an exemplary portable computing device and an exemplary stationary computing device that may be utilized by a sender to request one or more available communication modes for communicating information to a recipient.

FIG. 6A shows an exemplary portable computing device 600 and an exemplary stationary computing device 650 that may be utilized by a sender 135 (FIG. 1) to request one or more available communication modes for communicating information to a recipient. The computing devices 600 and 650 may include a display 605 and/or an input portion 610.

The display 605 may correspond to a liquid crystal display (LCD), an organic light emitting diode (OLED), a flat panel display, a solid state display, a cathode ray tube (CRT), a projector, or other device configured to display information. The display 605 may act as an interface for the sender 135 to see the functioning of the processor, or specifically as an interface with the software executed by the computing devices 600 and 650.

The input portion 610 may correspond to a keypad, mouse, or other device for entering information into the computing devices 600 and 650. For example, the input portion 610 may enable the sender 135 to specify a recipient to whom the sender 135 wishes to communicate information. Characterization fields that characterize the communication may also be specified. Other information may also be entered via the input portion 610.

Figure 6B:
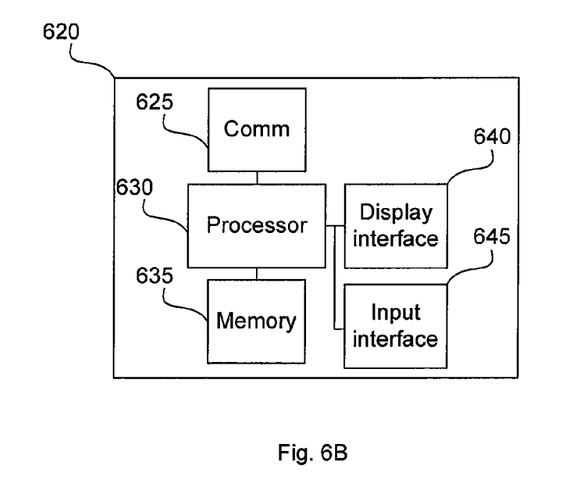
FIG. 6B illustrates exemplary circuitry that may reside within the computing devices of FIG. 6A.

FIG. 6B illustrates exemplary circuitry 620 that may reside within the computing devices 600 and 650 of FIG. 6A. The circuitry 620 may include one or more processors 630, memories 635, and communication circuits 625. The circuitry 620 may also include a display interface 640 and an input interface 645.

The memory or memories 630 may include instructions that are executable by the one or more processors 630 to cause the processors 625 to communicate, via the display interface 640, the exemplary user interface screen 400 (FIG. 4) to the display 605. The instructions may also be operable to cause the processors 630 to receive input, via the input interface 645, from the input portion 610. The instructions may also be operable to cause the processors 630 to perform any of the operations defined above and/or other operations. The memory 635 may be a random-access-memory (RAM), read-only-memory (ROM), FLASH memory, a different memory, or any combination of these memories.

The communication circuitry 640 may enable the computing devices 600 and 650 to communicate with the system 100 (FIG. 1). For example, the computing devices 600 and 650 may include wired and/or wireless networking circuitry that enables communicating data to and from the system 100. The data communicated to the system 100 may define information specified by the sender 135, such as a recipient of a communication and characterization information that characterizes the communication. The data communicated from the system 100 may include data that defines a preferred communication mode. Other information may be communicated to and from the system 100. The communication circuitry may enable data communications via various technologies, such as a cellular telephone network, an 802.11, 802.16, 802.20, WiMax network, or other network.

As described above, the system and method overcome the problems with existing communication system by suggesting an optimal communication mode to a sender of a communication. Generally, a sender of a communication requests the optimal communication mode for communicating with a recipient of the communication under a given set of circumstances. The system determines the context of the recipient and the communication modes available for communicating with the recipient. Then the system ranks the available communication modes according to a set of rules. The ranked communication modes are then communicated to the sender so that the sender can choose the most appropriate communication mode.

While the system and method have been described with reference to certain embodiments, it will be understood by those skilled in the art that various changes may be made and equivalents may be substituted without departing from the scope of the claims of the application. For example, in addition to rules identified above, other rules may be established. For instance, new rules may include user-to-user, group-to-group, and/or subordinate policies. Communications, in this case may occur by whatever policy defines the interactions that can reflect how communication should work within an organization's governmental policy. For example, the hierarchal relationship between the sender and the recipient may be considered.

In addition, users may be able to specify which communication modes may be available and under what circumstances. For example, a user may be in possession of his cell phone, but does not want to be reached via the cell phone. In this case, the system described above may be operable to receive rules from individual users to enable more user control.

In addition, to the above, many other modifications may be made to adapt a particular situation or material to the teachings without departing from its scope. Therefore, it is intended that connector and method for using the connector are not to be limited to the particular embodiments disclosed, but to any embodiments that fall within the scope of the claims.

We claim:

1. A method for communicating information comprising:
   receiving communication from a sender;
   determining a location of a recipient using a user location server;
   determining a location of a recipient device using a device location server;
   generating, by a central processing server, a ranked list of a plurality of available communication modes, wherein the ranked list is ranked according to the location of the recipient and the location of the recipient device according to one or more rules;
   updating, by the central processing server, the ranked list of the plurality of available communication modes based on a characterization of the communication received from the sender; and
   sending the ranked list of the plurality of available communication modes to the sender of the communication.

2. The method according to claim 1, further comprising:
   deriving a context of the recipient from calendaring information; and
   ranking the ranked list according to the calendaring information.

3. The method according to claim 2, further comprising communicating the calendaring information from a groupware server.

4. The method according to claim 1, wherein available communication modes correspond to capabilities associated with one or more devices that are in proximity with the recipient.

5. The method according to claim 1, wherein the plurality of available communication modes are ranked according to a cost associated with each of the plurality of available communication modes.

6. A communication system comprising:
   a central processing server configured to rank a plurality of available communication modes according to a context of a recipient of a communication, characteristics of the communication, and one or more rules; and
   a device location server configured to determine locations of a plurality of devices;
   wherein the central processing server is configured to communicate a ranked list of the available communication modes to a sender of the communication, wherein the ranked list includes the locations of the plurality of devices,
   wherein the available communication modes include one or more electronic communication modes and an in-person face-to-face communication mode.

7. The system according to claim 6, wherein the context of the recipient corresponds to the location of the recipient.

8. The system according to claim 7, further comprising a user location server operable to determine the location of the recipient.

9. The system according to claim 6, wherein the central processing server is operable to derive the context of the recipient from calendaring information.

10. The system according to claim 9, further comprising a groupware server in communication with the central processing server operable to communicate the calendaring information.

11. The system according to claim 6, wherein the available communication modes are ranked according to a cost associated with each of the one or more available communication modes.

12. The system according to claim 6, wherein the available communication modes are ranked according to capabilities associated with each of the available communication modes.

13. A method for communicating information comprising:
   requesting, using a sending device, communication with a recipient;
   providing, using the sending device, an expected length of time for the communication with the recipient;
   receiving, at the sending device, a list of a plurality of communication modes for communicating with the recipient, wherein the list is ranked according to at least the expected length of time; and
   displaying the list of the plurality of communication modes at the sending device.

14. The method according to claim 13, wherein the communication modes correspond to capabilities associated with one or more devices that are in proximity with the recipient and the list of the plurality of communication modes includes an in-person face-to-face communication mode.

15. A non-transitory machine-readable storage medium having stored thereon a computer program comprising at least one code section for communicating information, the at least one code section being executable by a machine for causing the machine to perform acts of:
   determination of a location of a recipient using a user location server;
   determination of a location of a recipient device using a device location server;
   generation of a ranked list of a plurality of available communication modes according to the location of the recipient, the location of the recipient device, a context of the recipient of a communication, characterization of the communication by a sender of the communication, and one or more rules, wherein the available communication modes include an in-person face-to-face communication mode; and transmission of the ranked list of the plurality of available communication modes to the sender of the communication.

16. The method of claim 1 wherein, the characterization of the communication received from the sender further comprises an urgency and a confidentiality of the communication.

17. The communication system of claim 6, wherein the characteristics of the communication include an urgency, an expected length, and a confidentiality of contents of the communication.

18. The method of claim 13, further comprising:

specifying, at the sending device, an urgency of the communication;

receiving, at the sending device, an updated ranked list of the plurality of communication modes for communicating with the recipient, in response to the sender specified characteristic urgency; and displaying the updated list of the plurality of communication modes at the sending device.

19. The non-transitory machine-readable storage medium of claim 15, wherein the characteristics associated with the communication comprise urgency, expected length of time, and confidentiality.

20. The non-transitory machine-readable storage medium of claim 15, wherein the plurality of available communication modes further include electronic communication modes comprising wired communication, and wireless communication.

21. The method of claim 1 wherein, the characterization of the communication received from the sender further comprises an estimated length of time of the communication.

* * * * *